United States Patent
Kim et al.

(10) Patent No.: US 11,513,049 B2
(45) Date of Patent: Nov. 29, 2022

(54) SYSTEM, APPARATUS, AND METHOD FOR DETECTING MICROBES

(71) Applicant: THE WAVE TALK, INC., Daejeon (KR)

(72) Inventors: Young Dug Kim, Gyeonggi-do (KR); Kyoung Man Cho, Seoul (KR)

(73) Assignee: THE WAVE TALK, INC., Daejeon (KR)

( * ) Notice: Subject to any disclaimer, the term of this patent is extended or adjusted under 35 U.S.C. 154(b) by 172 days.

(21) Appl. No.: 17/184,753

(22) Filed: Feb. 25, 2021

(65) Prior Publication Data
US 2021/0270713 A1   Sep. 2, 2021

(30) Foreign Application Priority Data
Mar. 2, 2020 (KR) .......................... 10-2020-0025969

(51) Int. Cl.
*G01N 15/06*   (2006.01)
*G01N 21/47*   (2006.01)

(52) U.S. Cl.
CPC ......... *G01N 15/0612* (2013.01); *G01N 21/47* (2013.01); *G01N 2021/4735* (2013.01)

(58) Field of Classification Search
CPC ............... G01N 15/0612; G01N 21/47; G01N 2021/4735; G01N 2015/0687; G01N 2015/0693; G01N 15/06; G01N 2015/0065; G01N 21/4788; G01N 2021/479; G01N 15/0227; G01N 2015/03; G01N 2015/1006; G12Q 1/04
See application file for complete search history.

(56) References Cited

U.S. PATENT DOCUMENTS 8,877,458 B2 * 11/2014 Maurer .............. G01N 15/1429
                                                        356/336
10,001,467 B2 * 6/2018 Park .................. G01N 21/4795

FOREIGN PATENT DOCUMENTS

JP    2019078630    5/2019
KR    1020180055301    11/2016

* cited by examiner

*Primary Examiner* — Seung C Sohn
(74) *Attorney, Agent, or Firm* — Stuart H. Mayer; Mayer & Williams PC

(57) ABSTRACT

A system for detecting microbes is provided. In the system for detecting microbes, light is emitted to a sample through a light emission module, a sensor module detects speckles generated when the emitted light is scattered by motion of bacteria or microbes contained in the sample, and a controller stores and analyzes images detected by the sensor module to test microbial detection, wherein controller may include a light emission controller connected to the light emission module and configured to control an emission period and an emission intensity of light emitted by the light emission module; an imaging collector connected to the sensor module and configured to store a speckle image generated through multiple scattering by the bacteria or microbes contained in the sample; a corrector configured to correct a deviation caused by a difference in the amount of light when the light emission module emits the light; and an estimator configured to estimate, in real-time, presence or absences of the bacteria or microbes in the sample or a concentration of the bacteria or microbes.

9 Claims, 12 Drawing Sheets

SYSTEM, APPARATUS, AND METHOD FOR DETECTING MICROBES

CROSS-REFERENCE TO RELATED APPLICATION(S)

This application claims the benefit under 35 USC § 119(a) of Korean Patent Application No. 10-2020-0025969, filed on Mar. 2, 2020, in the Korean Intellectual Property Office, the entire disclosure of which is incorporated herein by reference for all purposes.

BACKGROUND

1. Field

The following description relates to a system, apparatus, and method for detecting microbes, and more particularly, to a system, apparatus and method for detecting microbes, which can sense motion of bacteria or microbes contained in an object by use of laser speckles.

2. Description of Related Art

Microbes or fine lives affecting health states of the human beings are not visible to human eyes, but exist around human beings and trigger various illnesses. In order to measure such microbes, a microbe cultivation method, a mass spectrometry method, an unclear magnetic resonance method, and the like are generally used as methods of measuring bacteria or microbes. In the case of the microbe cultivation method, the mass spectrometry method, and the unclear magnetic resonance method, specific types of microbes can be precisely measured, but it takes a long time to prepare samples, and expensive, precise, and complicated equipment is necessary.

In addition, there are methods of measuring bacteria or microbes using optical techniques, such as Raman spectrometry or multispectral imaging. However, such methods have drawbacks in that complex optical systems are necessary and specialized knowledge and laboratory-level facilities for operating the complex optical systems and a long period of time for measurement are required.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Measurement of bacteria or microbes using the conventional optical techniques requires complex optical systems and specialized knowledge and laboratory-level facilities for operating these complex optical systems, and also requires a long time for measurement.

Exemplary embodiments of the present invention provide a system, apparatus, and method for detecting microbes, which can test susceptibility of bacteria, or microbes to antibiotics by quickly sensing motion of the bacteria or microbes contained in an object by use of changes in laser speckle.

According to an embodiment of the present invention, a system for detecting microbes is provided. The system for detecting microbes is a system in which light is emitted to a sample through a light emission module, a sensor module detects speckles generated when the emitted light is scattered by the motion of bacteria or microbes contained in the sample, and a controller stores and analyzes images detected by the sensor module to test microbial detection, wherein controller may include a light emission controller connected to the light emission module and configured to control an emission period and an emission intensity of light emitted by the light emission module; an imaging collector connected to the sensor module and configured to store a speckle image generated through multiple scattering by the bacteria or microbes contained in the sample; a corrector configured to correct a deviation caused by a difference in the amount of light when the light emission module emits the light; and an estimator configured to estimate, in real-time, presence or absences of the bacteria or microbes in the sample or a concentration of the bacteria or microbes.

According to an embodiment of the present invention, the corrector may include a light amount calculator configured to calculate an amount of light that is a numerical value of brightness of the speckle image stored in the imaging collector; a light amount comparer configured to compare the amount of light with a preset reference range to determine whether the amount of light falls within the reference range; and a shutter speed controller configured to control the brightness of the speckle image by adjusting a shutter speed when the amount of light does not fall within the preset reference range.

According to an embodiment of the present invention, the controller may further include an obtainer configured to obtain a temporal correlation of the speckles by using the detected speckle.

According to one embodiment of the present invention, a method of detecting microbes is provided. The method of detecting microbes may include a light irradiation step of emitting, at a light emission module, light to bacteria or microbes contained in a sample; an imaging collection step of storing, at a sensor module, a speckle image generated through multiple scattering by the bacteria or microbes contained in the sample; a light-amount calculation step of calculating, at a light amount calculator provided in a controller, an amount of light that is a numerical value of brightness of the speckle image; and a comparison step of comparing, at a light amount comparer provided in the controller, the amount of light with a preset reference range to determine whether the amount of light falls within the reference range, and the method may further include an estimation step of estimating, in real-time, presence or absence of the bacteria or microbes in the sample or a concentration of the bacteria or microbes when it is determined in the comparison step that the amount of light falls within the reference range; and a shutter speed adjustment step of controlling the brightness of the speckle image by adjusting a shutter speed when it is determined in the comparison step that the amount of light falls out of the reference range.

According to an embodiment of the present invention, the method may further include, after the shutter speed adjustment step, a shutter speed setting range comparison step of comparing the shutter speed with a preset shutter speed setting range to determine whether the shutter speed adjusted in the shutter speed adjustment step falls within the shutter speed setting range.

According to an embodiment of the present invention, an apparatus for detecting microbes is provided. The apparatus for detecting microbes may include a body; a sample receiving module formed in the body and configured to accommodate a sample therein; a light emission module configured to emit light to the sample; a sensor module formed as a sensor to detect a speckle generated when the light emitted to the sample is scattered by motion of bacteria or microbes contained in the sample; and a controller configured to control the light emitted by the light emission module and store and analyze images detected by the sensor module, wherein the controller may include a light emission controller connected to the light emission module and configured to control an emission period and an emission intensity of light emitted by the light emission module; an imaging collector connected to the sensor module and configured to store a speckle image generated through multiple scattering by the bacteria or microbes contained in the sample; a corrector configured to correct a deviation caused by a difference in the amount of light when the light emission module emits the light; and an estimator configured to estimate, in real-time, presence or absences of the bacteria or microbes in the sample or a concentration of the bacteria or microbes.

According to an embodiment of the present invention, the corrector may include a light amount calculator configured to calculate an amount of light that is a numerical value of brightness of the speckle image stored in the imaging collector; a light amount comparer configured to compare the amount of light with a preset reference range to determine whether the amount of light falls within the reference range; and a shutter speed controller configured to control the brightness of the speckle image by adjusting a shutter speed when the amount of light does not fall within the preset reference range.

According to an embodiment of the present invention, the light emission module may include a light source portion configured to generate the light; a light transmission medium configured to transmit the light generated by the light source portion; and a light exit portion configured to emit the light transmitted from the light transmission medium to the sample.

According to an embodiment of the present invention, the apparatus may further include a case provided with a cover that can open and close to cover the sample receiving module so that the sample is not exposed to an external environment when a test is performed by coupling a container that contains the sample to the sample receiving module.

Other features and aspects will be apparent from the following detailed description, the drawings, and the claims.

Figure 1:
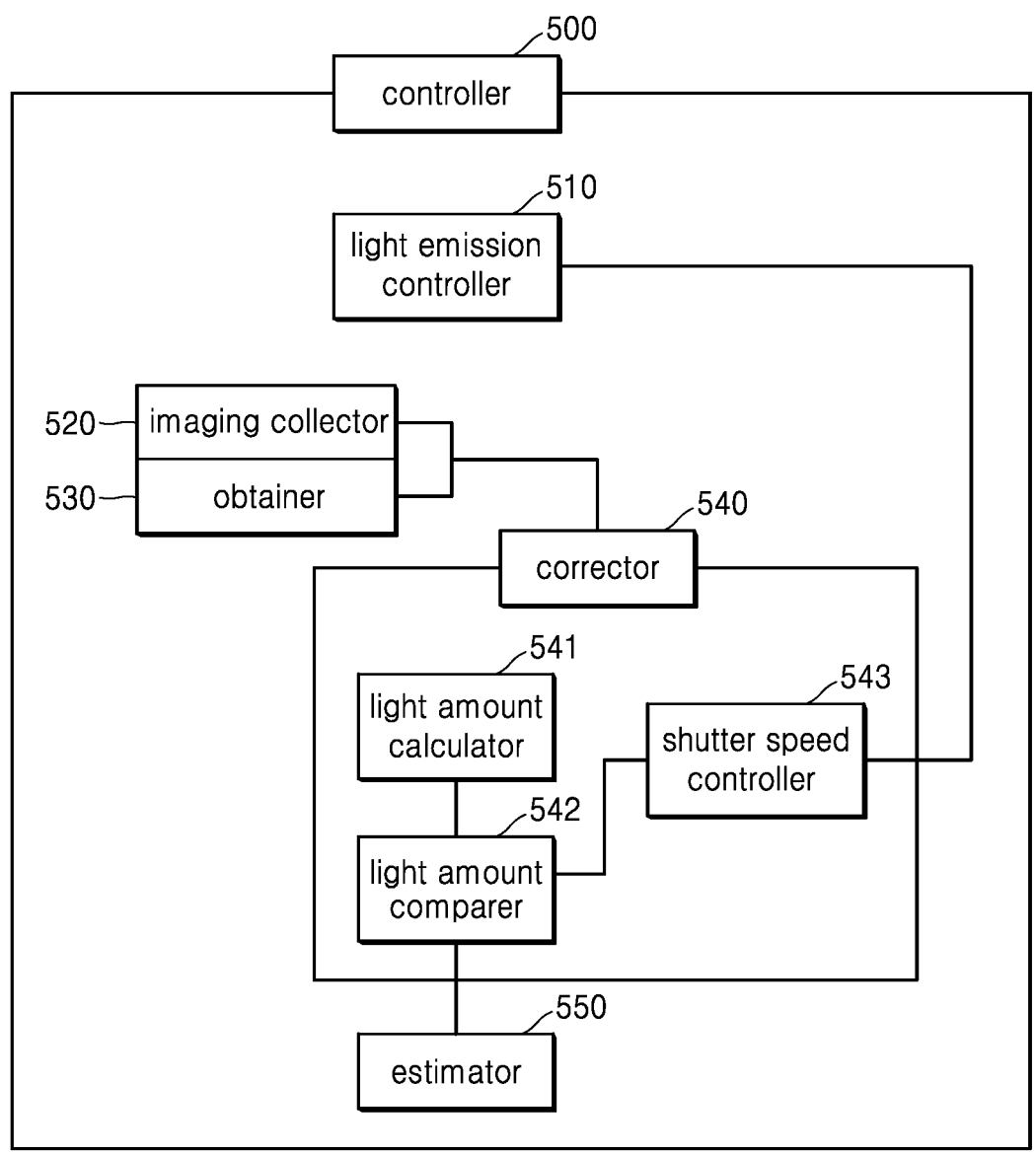
FIG. 1 is a conceptual diagram showing a system for detecting microbes according to an embodiment of the present invention.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Hereinafter, various exemplary embodiments of the present invention will be described in detail with reference to the accompanying drawings.

The invention is described more fully hereinafter with references to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. Throughout the drawings and the detailed description, unless otherwise described, the same drawing reference numerals are understood to refer to the same elements, features, and structures. The relative size and depiction of these elements may be exaggerated for clarity, illustration, and convenience.

Hereinafter, the embodiments of the present invention will be described with reference to the drawings which schematically illustrate the embodiments. In the drawings, for example, depending on a manufacturing technology and/or tolerance, modifications of illustrated shapes may be expected. Accordingly, it should be understood that the embodiments of the present disclosure are not limited to particular shapes in areas shown in the specification and may include, for example, changes in shape caused during a manufacturing process.

FIG. 1 is a conceptual diagram showing a system for detecting microbes according to an embodiment of the present invention.

First, in the system for detecting microbes according to the present invention, light may be emitted to a sample through a light emission module 300, and a sensor module 400 may detect speckle generated when the emitted light is scattered by the motion of bacteria or microbes contained in the sample, and a controller 500 may store and analyze images detected by the sensor module 400 to test microbial detection.

As shown in FIG. 1, the controller 500 may include a light emission controller 510, an imaging collector 520, a corrector 540, and an estimator 550.

The controller 500 may control the light emitted by the light emission module 300, and may store and analyze the images detected by the sensor module 400.

The light emission controller 510 may be connected to the light emission module 300 and control an emission period and an emission intensity of light emitted by the light emission module 300. For example, when the amount of light is controlled by controlling the emission period or emission intensity of light emitted to the sample and a sample is renewed for each time of measurement, the amount of light at each measurement may be equally controlled to minimize a deviation and a reference value may be extracted by arbitrarily controlling the amount of light.

In addition, even when the light is repeatedly used for the sample or the light is split and emitted to the sample, the intensity and amount of light may be controlled.

The imaging collector 520 may be connected to the sensor module 400 and store speckle images generated through multiple scattering by the bacteria or microbes contained in the sample. For example, the imaging collector 520 may control the sensor module 400 to store the speckle images of the scattered light at a predetermined interval for a predetermined period of time, and may store speckle images extracted by the sensor module 400.

When the light emission module 300 emits the light, the corrector 540 may correct deviation caused by a difference in the amount of light. For example, in the speckle image sensed by the sensor module 400, noise may be generated even with a slight vibration, and the speckle generated may vary according to the amount of light of a light source for generating the speckle. That is, when the detection is repeatedly performed on the sample, or when the detection is performed on a plurality of samples, if different light sources are used or light sources are not evenly split, an accurate analysis may not be feasible due to different wavelengths or different amounts of light.

The corrector 540 may include a light amount calculator 541, a light amount comparer 542, and a shutter speed controller 543.

The light amount calculator 541 may calculate an amount of light that is a numerical value of the brightness of the speckle image stored in the imaging collector 520.

If the amount of light calculated by the light amount calculator 541 is zero, which indicates that there is no light, it is determined that the speckle image is completely black. If the calculated amount of light is too high, the speckle image may not be confirmed because the speckle image is too bright.

In order to increase the precision of analysis of the speckle image, the amount of light is calculated and the calculated amount of light is adjusted to minimize deviation caused by a difference in the amount of light.

The light amount comparer 542 may compare the amount of light with a preset reference range to determine whether the amount of light falls within the reference range.

Specifically, the light amount comparer 542 may compare the numerical value of the brightness of the speckle image with the preset reference range when the amount of light calculated by the light amount calculator 541 is not zero. In this case, when the amount of light falls within the reference range, the amount of light may be controlled by the estimator 500, which will be described below.

On the other hand, when the amount of light does not fall within the reference range, the amount of light may be controlled by the shutter speed controller 543 that can adjust the speckle image by adjusting a shutter speed to make the speckle image bright or dark.

The shutter speed controller 543 may control the brightness of the speckle image by adjusting the shutter speed when the amount of light does not fall within the preset reference range.

Specifically, the shutter speed controller 543 is a controller capable of adjusting a shutter speed when the light amount comparer 542 determines that the amount of light falls out of the reference range. For example, if the value of the amount of light is lower than the reference range, the shutter speed controller 543 may slow down the shutter speed to increase the amount of light, and if the value of the amount of light is higher than the reference range, the shutter speed controller 543 may speed up the shutter speed to reduce the amount of light, thereby controlling the amount of light to fall within the reference range.

In addition, when detection is performed on the samples, a single light source may be repeatedly used or a light source is split for use. However, it is difficult to repeatedly use or split each light source in such a manner that the light source has a constant amount of light, and thus the deviation of the speckle images of a plurality of samples may be minimized by receiving a uniform amount of light from the repeatedly used or split light source.

That is, by adjusting the shutter speed which serves as an electrical aperture of the sensor module 400, it is possible to detect a speckle with a constant amount of light, and accordingly, deviation of the speckles of the plurality of samples caused by the difference in the amount of light can be minimized.

The estimator 550 may estimate, in real-time, the presence or absence of bacteria or microbes in the sample or the concentration of the bacteria or microbes. For example, the multiplication, inhibition, or reduction of bacteria or microbes may be analyzed by analyzing a variation over time of the bacteria or microbes contained in the sample through the speckle images stored in the imaging collector 520 and a temporal correlation of the speckles obtained by an obtainer 530.

That is, in the controller 500, an optical path that slightly changes over time due to microscopic biological activities of microbes (e.g., intracellular movement, movement of microbes, etc.) and is detected by the sensor module 400 may be stored in the imaging collector 520, a temporal change in a speckle pattern may be obtained by the obtainer 530, a difference in the amount of light may be corrected by the corrector 540, and the speckle pattern that changes due to the fine change in the optical path may be analyzed by the estimator 550.

In this way, by measuring the temporal change in the detected speckle pattern, the biological activities of the microbes may be rapidly measured. As such, in the case where the change over time of the speckle pattern is measured, the multiplication, inhibition, and reduction over time of the microbes may be confirmed by analyzing the presence or absence and the change in concentration of the microbes contained in the sample to which an antibiotic is injected.

For example, the sensor module 400 may detect a first image before injection of the antibiotic, detect a second image after injection of the antibiotic, and transmit the detected images to the imaging collector 520, and the estimator 550 may analyze changes in the transmitted first and second images.

If there is no motion of microbes or bacteria contained in the sample, coherent-light speckles appear with a uniform interference pattern along time. That is, if there is no motion of bacteria or microbes in the sample, a uniform interference pattern of coherent-light speckles are found from coherent-light speckle images taken every reference time. As such, when the coherent-light speckle images show a uniform interference pattern, the controller 500 may determine that microbes or bacteria are reduced and eliminated (no longer exist) in the sample.

On the other hand, when the coherent-light speckle pattern changes, the controller 500 may estimate that bacteria and microbes remain in the sample. That is, in the case where bacteria or microbes are present in the sample, such changes may be estimated as due to multiplication and continuous motion of the bacteria and microbes along time. This motion of the bacteria and microbes may cause a continuous change of the laser speckle pattern along time, and accordingly, when the coherent-light speckle pattern is changed to a degree greater than or equal to a predetermined error range in the coherent-light speckle images measured every reference time, the controller 500 may determine that bacteria and microbes are still present in the sample.

In addition, as shown in FIG. 1, the controller 500 may further include the obtainer 530.

The obtainer 530 may obtain a temporal correlation of the speckles by using the detected speckles. For example, when the images are collected by the sensor module 400 and stored in the imaging collector 520, the obtainer 530 may simultaneously analyze the temporal correlation of the collected speckle images.

The controller 500 may control the sensor module 400 to detect speckles at more multiple time points.

Figure 2:
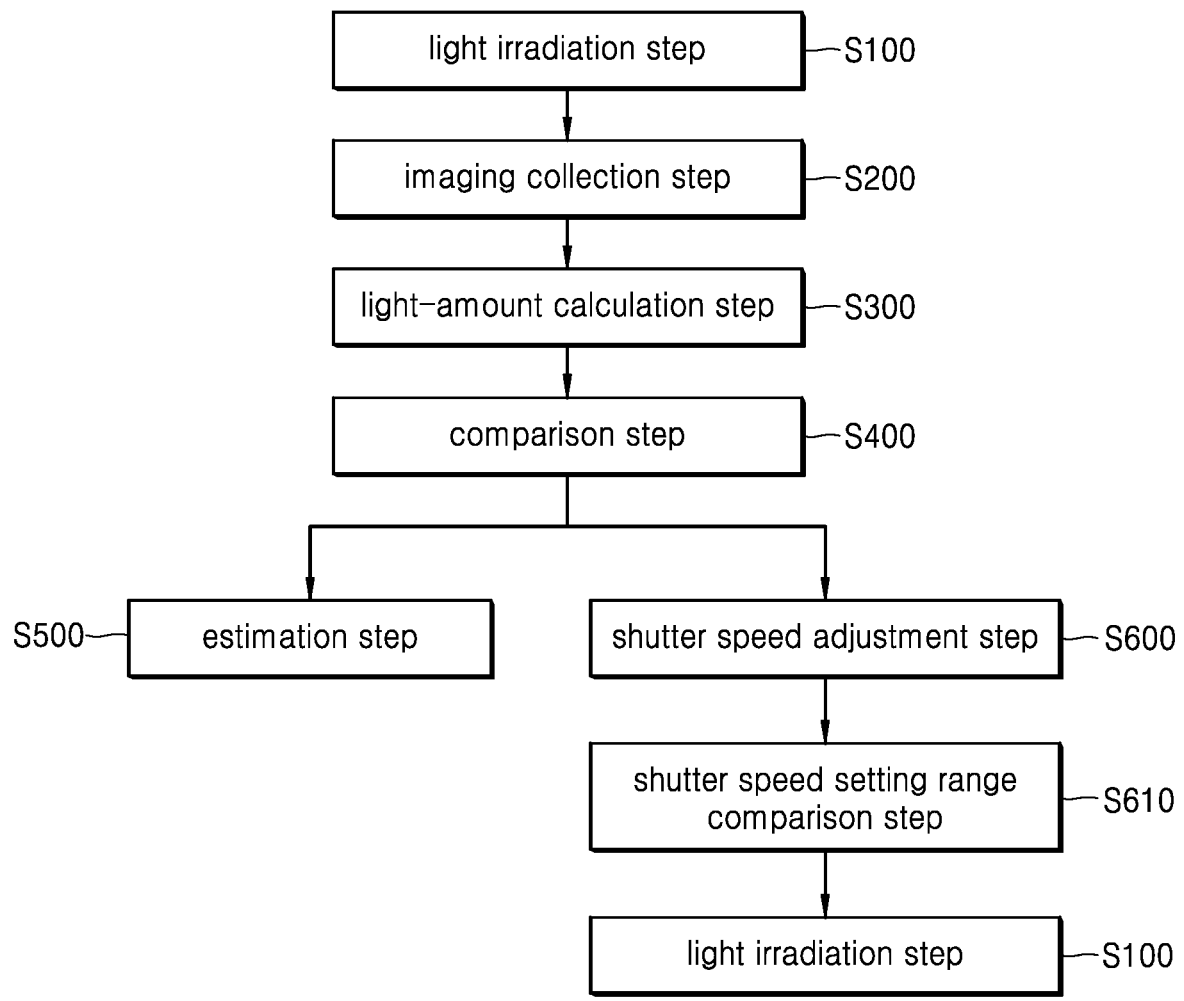
FIG. 2 is a flowchart illustrating a method of detecting microbes according to an embodiment of the present invention.

FIG. 2 is a flowchart illustrating a method of detecting microbes according to an embodiment of the present invention.

The method of detecting microbes according to the present invention includes a light irradiation step S100, an imaging collection step S200, a light-amount calculation step S300 and a comparison step S400, and may further include an estimation step S500 or a shutter speed adjustment step S600.

In the light irradiation step S100, a light emission module 300 emits light to bacteria or microbes contained in a sample. More specifically, light produced by a light source portion 310 is transmitted to a light exit portion 330 through a light transmission medium 320 and the transmitted light is emitted to the sample.

In this case, a light source splitting step in which the light produced by the light source portion 310 monolithically formed is split through a light source splitting device 340 and emitted to the light exit portion 330 provided in plural may be further included.

In the imaging collection step S200, speckle images generated through multiple scattering of the light due to bacteria or microbes contained in the sample are stored in a sensor module 400.

Specifically, in the imaging collection step S200, a laser speckle generated when the emitted light is multiple-scattered by the sample is measured every preset time point or every arbitrary time interval.

In the light-amount calculation step S300, the amount of light, which is a numerical value of the brightness of the speckle image, is calculated by a light amount calculator formed in a controller.

Specifically, in the light-amount calculation step S300, the speckle image is detected by the sensor module 400 with an algorithm for correcting the amount of light and then the amount of light of the speckle image. For example, if the amount of light is zero, which indicates that there is no light, the speckle image is determined to be completely black, and thus, an error may be output to a display or a display part to inform a user. Alternatively, the method steps may be reiterated starting back from the light irradiation step S100.

On the other hand, if the amount of light is not zero, the method proceeds to the comparison step S400 described below.

In the comparison step S400, a light amount comparer 542 included in the controller 500 compares the calculated amount of light with a preset reference rang to determine whether the amount of light is within the reference range.

For example, if the amount of light calculated in the light-amount calculation step S300 is not zero, the numerical value of the brightness of the speckle image is compared with the preset reference range. In this case, when the amount of light falls within the reference range, the amount of light is corrected, and the method proceeds to the estimation step S500 described below.

On the other hand, if the amount of light does not fall within the reference range, the shutter speed adjustment step S600 in which the speckle image is adjusted by adjusting a shutter speed to make the speckle image bright or dark is performed.

In the estimation step S500, the presence or absence of bacteria or microbes in the sample or the concentration of the bacteria or microbes is estimated in real-time when the amount of light falls within the reference range.

For example, in the estimation step S500, when it is determined in the comparison step S400 that the amount of light falls within the reference range, the multiplication, inhibition, or reduction of bacteria or microbes may be analyzed by analyzing a variation over time of the bacteria or microbes contained in the sample through the speckle images stored in the imaging collector 520 and a temporal correlation of the speckles obtained by an obtainer 530

In the shutter speed adjustment step S600, the brightness of the speckle image is controlled by adjusting the shutter speed when the amount of light falls out of the reference range.

Specifically, in the shutter speed adjustment step S600, the shutter speed is adjusted when it is determined in the comparison step S400 that the amount of light falls within the reference range. For example, if the value of the amount of light is lower than the reference range, the shutter speed may be slowed down to increase the amount of light, and if the value of the amount of light is higher than the reference range, the shutter speed may be increased to reduce the amount of light, thereby controlling the amount of light to fall within the reference range.

At this time, when the amount of light falls within the reference range, after the shutter speed adjustment step S600, the method steps may be reiterated from the light irradiation step S100.

In addition, the method of detecting microbes according to the present invention may further include a shutter speed setting range comparison step S610.

In the shutter speed setting range comparison step S610, after the shutter speed adjustment step S600, the shutter speed adjusted in the shutter speed adjustment step S600 is compared with a preset shutter speed setting range to determine whether the shutter speed falls within the shutter speed setting range.

Specifically, in the shutter speed setting range comparison step S610, the shutter speed adjusted in the shutter speed adjustment step S600 may be controlled to operate within a predetermined range. For example, if the shutter speed is adjusted to be too fast or too slow in the shutter speed adjustment step S600, a speckle image may be detected in a state where scattering does not sufficiently occur, or a speckle image with excessive noise may be detected, which may degrade the reliability of a test.

That is, in the shutter speed setting range comparison step S610, whether the adjusted shutter speed value does not exceed the setting range is checked, and if it does not exceed the setting range, the light irradiation step S100 may be reiterated with the reset shutter speed.

On the other hand, when the adjusted shutter speed value exceeds the setting range or is zero, an error may be output to a display or a display part to inform the user. Alternatively, the method steps may be reiterated starting back from the light irradiation step S100.

Figure 3:
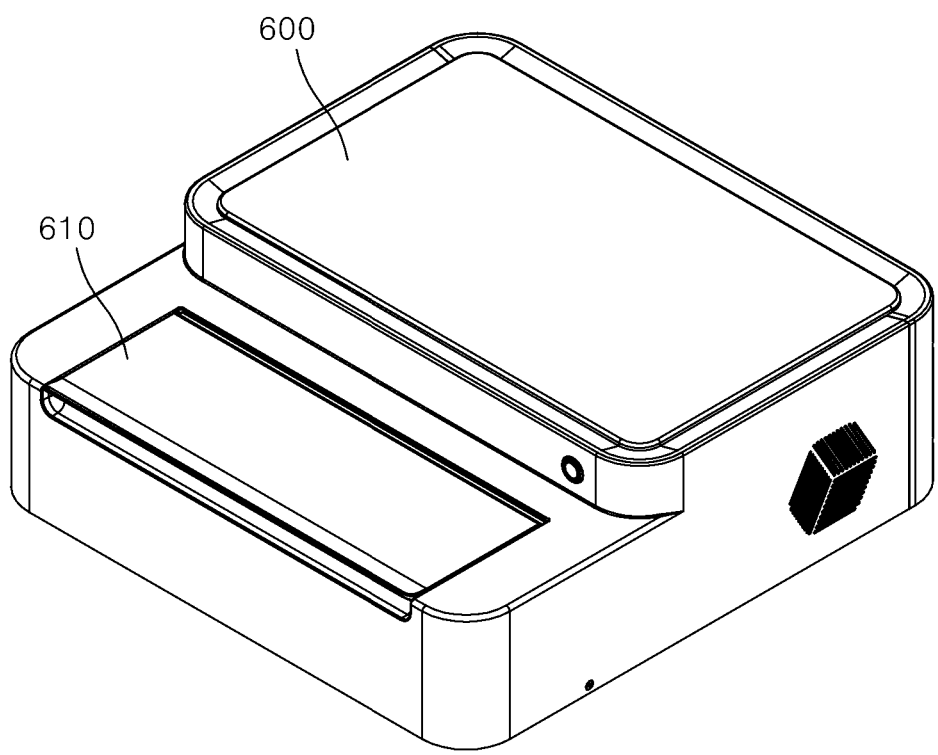
FIG. 3 is a perspective view of an apparatus for detecting microbes according to an embodiment of the present invention.
Figure 4:
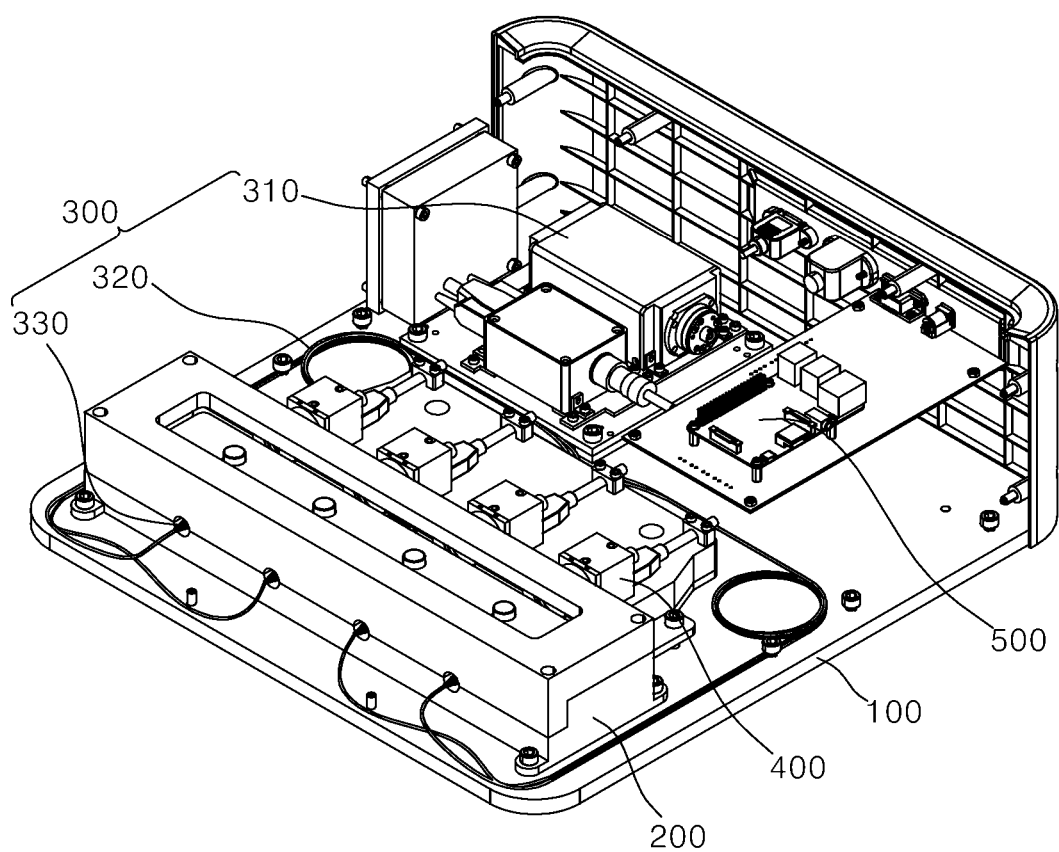
FIG. 4 is a perspective view of an interior of an apparatus for detecting microbes according to an embodiment of the present invention.
Figure 5:
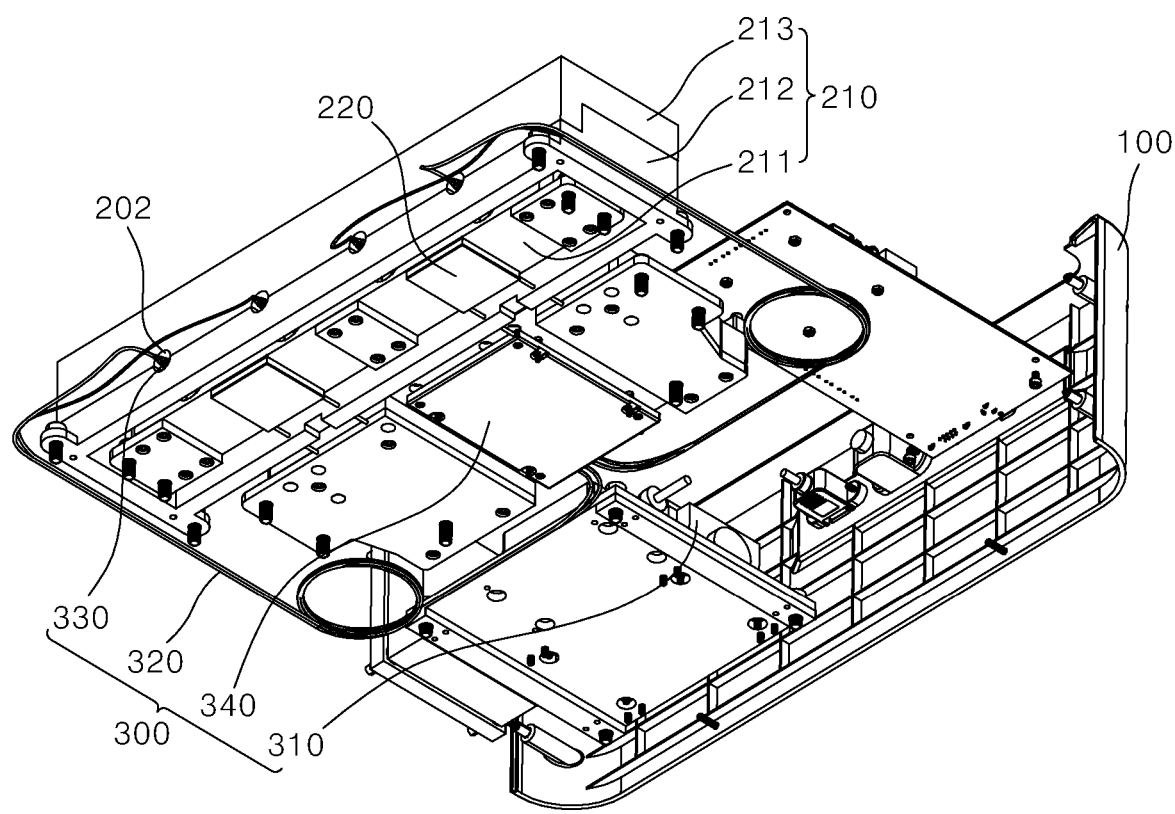
FIG. 5 is a bottom perspective view showing a lower portion of the apparatus for detecting microbes shown in FIG. 4.

FIG. 3 is a perspective view of an apparatus for detecting microbes according to an embodiment of the present invention, FIG. 4 is a perspective view of an interior of the apparatus for detecting microbes shown in FIG. 3, and FIG. 5 is a bottom perspective view showing a lower portion of the apparatus for detecting microbes shown in FIG. 4.

As shown in FIGS. 3 to 5, the apparatus for detecting microbes according to an embodiment of the present invention may largely include a body 100, a sample receiving module 200, a light emission module 300, a sensor module 400, a controller 500, and a case 600.

Here, for example, the body 100 may be a structure with a support space formed at an upper portion thereof, which has sufficient strength and durability to support the sample receiving module 200, the light emission module 300, the sensor module 400, and the controller 500.

As shown in FIGS. 4 and 5, the sample receiving module 200 may be formed in the body 100, and may accommodate a sample therein and include a sample receiving block 210 and a heating device 220.

Figure 6:
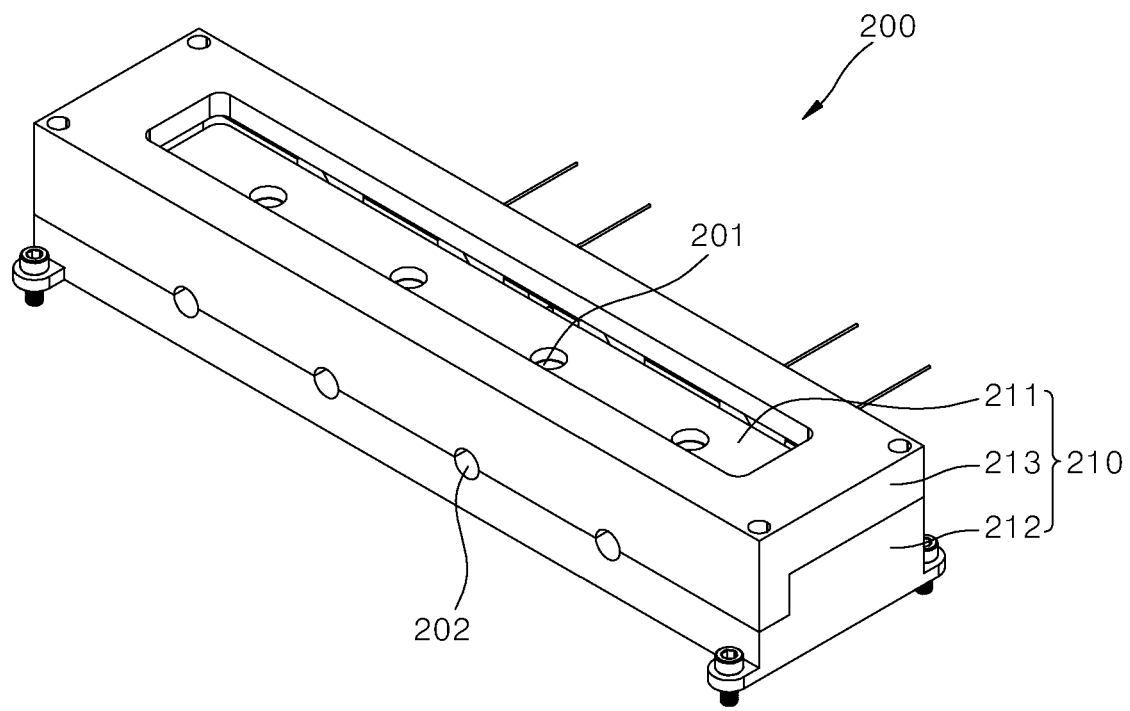
FIG. 6 is a perspective view of a sample receiving module of FIG. 4.
Figure 7:
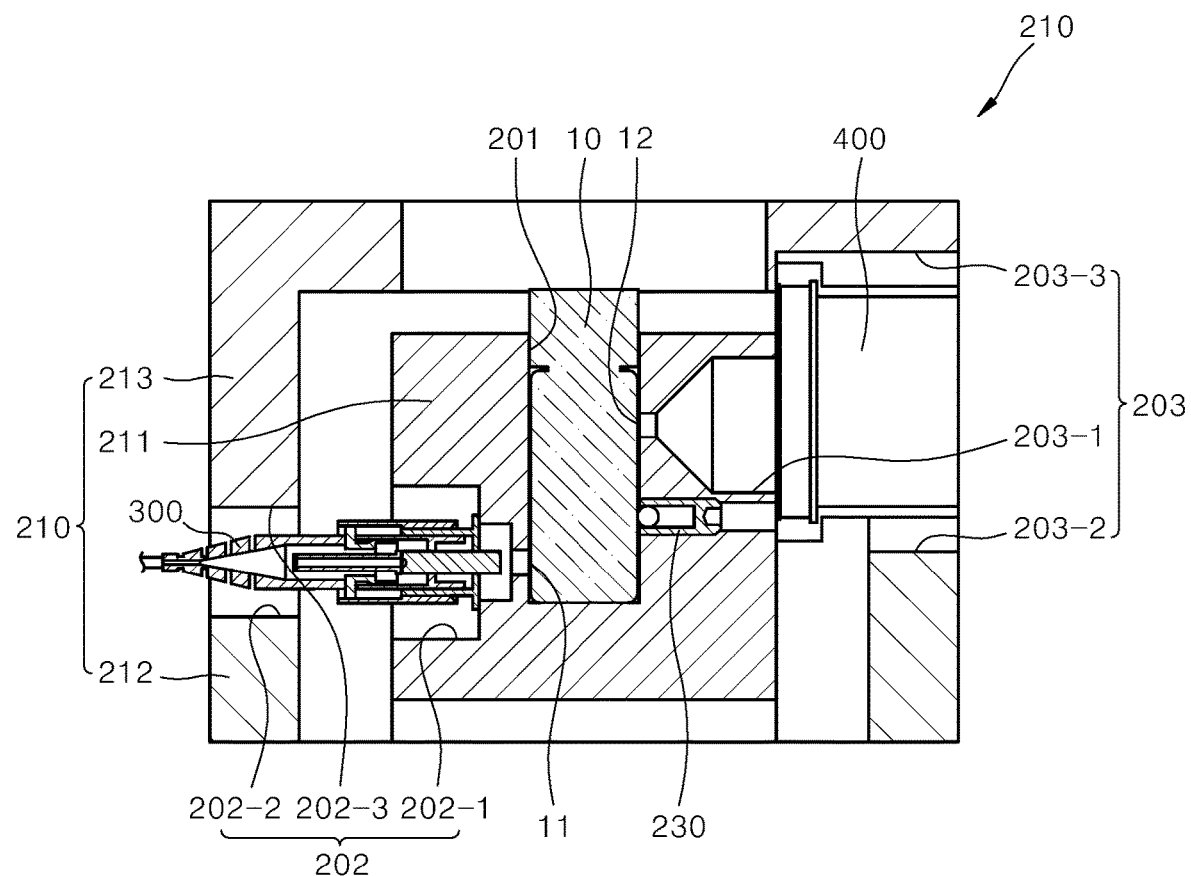
FIG. 7 is a cross-sectional view showing a cross section of the sample receiving module of FIG. 4.

FIG. 6 is a perspective view of the sample receiving module 200 of the apparatus for detecting microbes shown in FIG. 4, and FIG. 7 is a cross-sectional view showing a cross section of the sample receiving module 200 of FIG. 4.

As shown in FIGS. 6 and 7, the sample receiving block 210 is formed with a sample groove portion 201 capable of accommodating a container 10 that contains the sample, and may include a block body 211, a first block 212, a second block 213, the sample groove portion 201, an emission device receiving portion 202, and an image detecting portion 203.

The block body 211 may have the sample groove portion 201 formed on an upper portion thereof. For example, the block body 211 may be formed in a shape of a hexahedron, in which the sample groove portion 201 capable of accommodating the container 10 that contains the sample may be formed on the upper portion, a groove into which at least a portion of the light emission module 300 is inserted may be formed one lateral side, and a groove capable of accommodating at least a portion of the sensor module 400 or a condensing lens may be formed on the other lateral side to allow the sensor module 400 to receive scattered light.

In this case, the sample groove portion 201 may be formed in a groove shape that can accommodate the sample, so that a space in which the sample can be received is formed. In addition, it is preferable that the container 10 accommodates the sample and the container 10 accommodating the sample is inserted into the sample groove portion 201.

The sample may include a sample such as saliva, blood, or tissue, or an organic sample such as food.

The block body 211 may be formed of aluminum having excellent thermal conductivity and relatively high light reflectivity. Aluminum may easily transfer heat for incubating bacteria or microbes and may be optically useful in that it reflects emitted light.

The first block 212 may surround at least a portion of the block body 211, and may be in contact with and support lower surfaces of at least portions of the light emission module 300 and the sensor module 400.

For example, a seating portion may be formed on an upper portion of the first block 212 so that the block body 211 is seated thereon, or both the block body 211 and the first block 212 may be seated on the upper portion of the body 100 and each may be coupled to the body 100. Also, a support portion or a groove portion may be formed so that at least another portion of the light emission module 300 can be supported on one side of the first block 212, and another support portion or groove portion may be formed so that at least another portion of the sensor module 400 can be supported on the other side of the first block 212.

The second block 213 may surround at least another portion of the block body 211, may be in contact with upper surfaces of at least another portions of the light emission module 300 and the sensor module 400, and be coupled to the first block 212 to fix the light emission module 300 and the sensor module 400.

For example, the second block 213 may be coupled to the upper portion of the first block 212 and be formed in a shape that surrounds the block body 211 as a whole. Also, the second block 213 may be coupled to the first block 212 and may press upper and lower portions of the light emission module 300 and the sensor module 400 supported by the first block 212, thereby fixing them.

The emission device receiving portion 202 may be formed on one side of the sample receiving block 210 and communicate with the sample groove portion 201 to accommodate at least a portion of the light emission module 300.

For example, the emission device receiving portion 202 has a shape by which at least a portion of the light emission module 300 is inserted into one side of the block body 211 and at least another portion that is not inserted is surrounded by the first block 212 and the second block 213 so that, as a whole, a portion of the light emission module 300 is inserted into one side of the sample receiving block 210.

Specifically, the emission device receiving portion 202 may include a first emission device groove portion 202-1, a second emission device groove portion 202-2, and a third emission device groove portion 202-3.

The first emission device groove 202-1 may be formed in a groove shape on one side of the block body 211 so that an end of the light emission module 300 can be inserted thereinto, the second emission device groove 202-2 may be formed on one side of the first block 212 to surround a lower side of a portion of the light emission module 200, and the third emission device groove portion 202-3 may be formed on one side of the second block 213 corresponding to the second emission device groove portion 202-2 and may surround an upper side of a portion of the light emission module 300.

That is, when the first block 212 and the second block 213 are coupled, the second emission device groove portion 202-2 and the third emission device groove portion 202-3, which are respectively formed on one sides of the first block 212 and the second block 213, are coupled to face each other and form an emission device through-hole, and the end of the light emission module 300 may be inserted into the first emission device groove portion 202-1, passing through the emission device through-hole.

The image detecting portion 203 may be formed on the other side of the sample receiving block 210 and may communicate with the sample groove portion 201 so that the image scattered by the sample may be detected by the sensor module 400.

For example, the image detecting portion 203 may be coupled in a shape by which at least a portion of the sensor module 400 is inserted into the other side of the block body 211 and at least another portion of the sensor module 400 that is not inserted is surrounded by the first block 212 and the second block 213 so that, as a whole, a portion of the sensor module 400 is inserted into the other side of the sample receiving block 210.

Specifically, the image detecting portion 203 may include a first detection groove portion 203-1, a second detection groove portion 203-2, and a third detection groove portion 203-3.

The first detection groove portion 203-1 is formed in a groove shape on the other side of the block body 211 so that a part of the sensor module 400 can be inserted thereinto, and the second detection groove 203-2 may be formed on the other side of the first block 212 to surround a lower side of a portion of the sensor module 400, and the third detection groove portion 203-3 may be formed on the other side of the second block 213 corresponding to the second detection groove portion 203-2 and surround an upper side of a portion of the sensor module 400.

That is, when the first block 212 and the second block 213 are coupled, the second detection groove portion 203-2 and the third detection groove portion 203-2 respectively formed on the other sides of the first block 212 and the second block 213 may be coupled to face each other and form a sensor module through-hole, and a portion of the sensor module 400 may be inserted into the first detection groove portion 203-1, passing through the sensor module through-hole.

As shown in FIG. 5, the sample receiving module 200 may include a heating device 220.

The heating device 220 may supply heat to bacteria or microbes in the sample at a preset temperature. For example, the heating device 220 may minimize noise, such as vibration, by using a Peltier device or resistive heating.

Specifically, the apparatus for detecting microbes according to the present invention emits light to the sample and detects a speckle generated by bacteria or microbes contained in the sample by using the sensor module 400, and as a method of measuring the growth or reduction of the bacteria or microbes contained in the sample, an incubation process is required to culture bacteria.

In this case, since the speckle detected by the sensor module 400 is sensitive to the flow of bacteria or microbes contained in the sample, the flow must be constant, and a speckle imaging technique is an extremely sensitive technique, which may recognize vibration generated in surrounding environment as a noise source. Therefore, a Peltier element or resistive heating may be applied as a vibration-free heating means.

In addition, as shown in FIG. 7, the sample receiving module 200 according to an embodiment of the present invention may further include a ball plunger 230.

The ball plunger 230 may be formed to be inserted into the sample receiving block 210 so that it presses at least a portion of the container 10, when the container 10 is inserted into the sample receiving block 210, and thus the container 10 can be fixed to the sample receiving block 210.

For example, the ball plunger 230 is a mechanical component that includes a spring, and may be formed so that the container 10 can be fixed to the sample groove portion 201.

When the container 10 is shaken, vibration may cause bacteria or microbes contained in the sample to vibrate, which results in occurrence of noise, and noise may be included in the detected speckle. When such noise acts as a signal, it may have a significant impact on an analysis of a sensitive speckle image. Thus, when the container 10 is fixed to the sample groove portion 201 by using the ball plunger 230, noise may be prevented from being generated.

At this time, the container 10 may be formed overall in the shape of a column having an opening formed on an upper side and a bottom surface formed on a lower side, and a light-incident portion 11 that corresponds to the light emission module 300 and a light exit portion 12 that corresponds to the sensor module 400 may be formed such that they are not aligned with each other, so that the speckle generated by the light emission module 300 and detected by the sensor module 400 can be amplified.

For example, the container 10 may be formed of a transparent material through which light can be transmitted, and thus the light emitted from the light emission module 300 may be incident into the container 10 and the light scattered by the sample in the container 10 may be emitted again to the sensor module 40.

Specifically, a point on one lateral side of the container 10 into which the light is emitted by the light emission module 300 may be the light-incident portion 11 and a point on the other lateral side of the container 10 through which the light exits from the sensor module 400 to the outside of the container 10 may be the light exit portion 12. In this case, the light-incident portion 11 and the light exit portion 12 are formed not to be aligned with each other, so that scattered light that is generated by bacteria or microbes contained in the sample when the light emitted by the light emission module 300 is incident to the light-incident portion 11 and multiple-scattered in the container 10 can be amplified.

Figure 8:
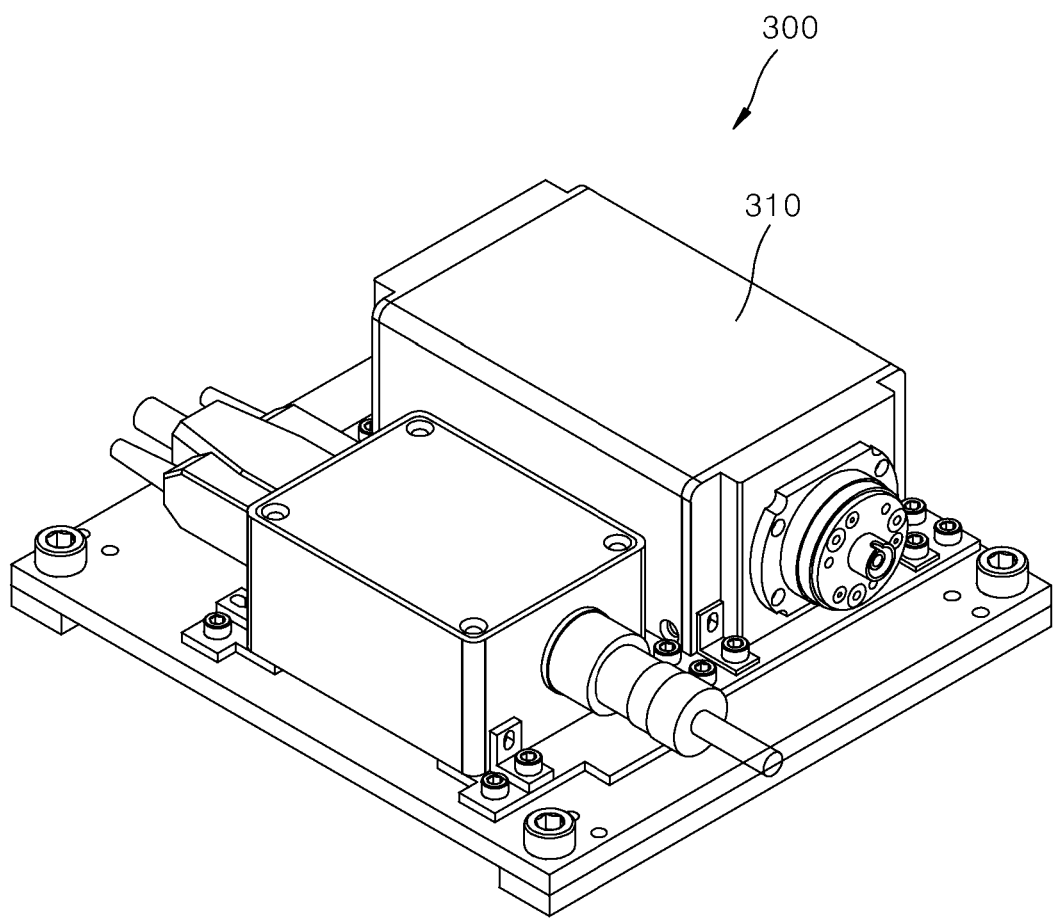
FIG. 8 is a perspective view of a light emission module of FIG. 4.

FIG. 8 is a perspective view of the light emission module 300 of the apparatus for detecting microbes shown in FIG. 4.

As shown in FIGS. 4 and 8, the light emission module 300 is a configuration for emitting light to the sample, and may include the light source portion 310, the light transmission medium 320, the light exit portion 330, and the light source splitting device 340.

The light emission module 300 may emit the light to the sample 10. In this case, the sample may contain bacteria or microbes and thus may have a non-uniform internal reflective index.

When light launched from the light emission module 300 is emitted to the sample, highly complex multiple scattering may occur inside the sample by the bacteria or microbes contained in the sample. Waves scattered in complicated paths through the multiple scattering may cause constructive interference or destructive interference, and the constructive or destructive interference of the waves generates a grainy pattern, that is, a speckle.

The light source portion 310, which is a device to generate light, may be supported on the upper portion of the body 100 and generate the light to be emitted to the sample. In order to form a speckle by emitting the light to the sample, laser light having a constant wavelength and excellent coherence may be used. In this case, measurement accuracy may increase as a spectral bandwidth of a wave that determines the coherence of the light decreases.

The light transmission medium 320 is a device that transmits light generated from the light source portion 310, and for example, the light transmission medium 320 may be an optical fiber.

The light exit portion 330 is provided to emit the light transmitted from the light transmission medium 320 to the sample. The light exit portion 320 may be formed at an end of the light emission module 300 and inserted into one side of the sample receiving module 200, and emit the light from one side of the sample toward the sample.

The light source splitting device 340 may split the light generated by the monolithically formed light source portion 310 into the light exit portion 330 provided in plural.

For example, a plurality of sample grooves 201 are formed in the sample receiving module 200 to accommodate a plurality of containers 10 containing the sample, and a plurality of light exit portions 330 may be formed to emit the light to the plurality of containers 10 accommodated in the plurality of sample grooves 201.

Specifically, the light source splitting device 340 is fixed to the upper portion of the body 100 and may emit light generated from one light source portion 310 to the plurality of light exit portions 330 through a plurality of light transmission media 320.

At this time, each light generated from the plurality of light exit portions 330 is emitted to each container 10 at the same wavelength, so that the bacteria or microbes contained in the sample are scattered by the light of the same wavelength. Accordingly, the samples contained in each container 10 may be more accurately compared.

Figure 9:
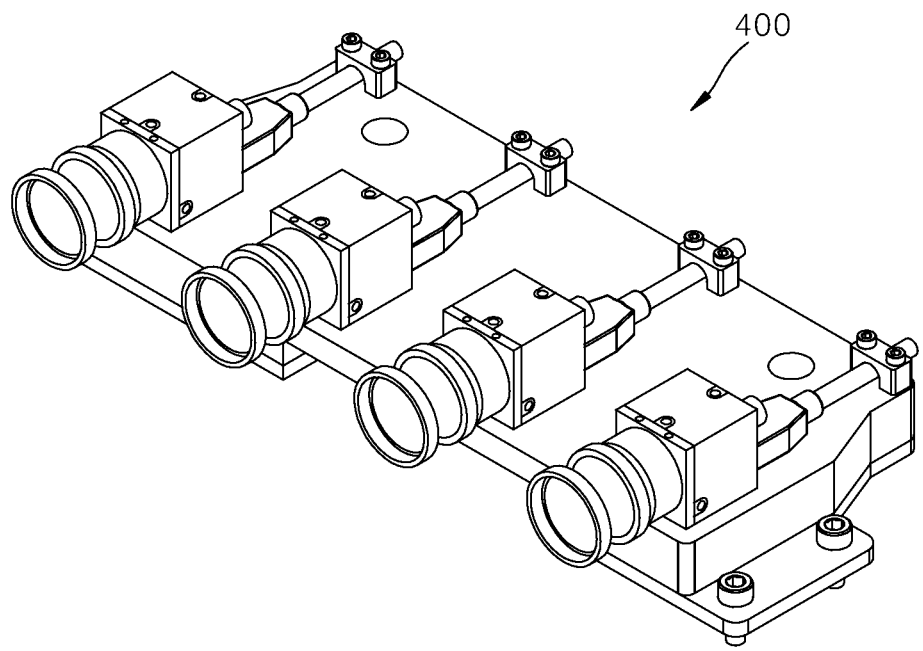
FIG. 9 is a perspective view of a sensor module of FIG. 4.

FIG. 9 is a perspective view of the sensor module 400 of the apparatus for detecting microbes shown in FIG. 4.

As shown in FIGS. 4 and 9, the sensor module 400 may detect a speckle generated when the light emitted to the sample is scattered by the movement of bacteria or microbes contained in the sample.

The sensor module 400 may be inserted into the other side of the sample receiving block 210 and detect a scattering light image of light scattered by the sample from the other side of the sample in the direction of the sample. For example, the sensor module 400 may include a light-receiving portion or a condensing lens to receive the scattered light.

The sensor module 400 may detect microscopic fluctuations in the speckle to sense motion of the bacteria or microbes contained in the sample.

The sensor module 400 may detect a laser speckle that is generated when the emitted light is multiple-scattered by the sample, every preset time point or every arbitrary time interval.

The sensor module 400 may include a sensing means corresponding to the type of light. For example, when a light source in the visible wavelength range is used, a charge-coupled device (CCD) camera, which is a photographing device, may be used.

The sensor module 400 may be preferably a camera capable of measuring two-dimensional information, and a camera that measures one-dimensional information may also be used. Further, the camera may further include an optical system, such as a micro lens, between the sample and the camera so as to minimize an autofocusing effect of the camera and overcome an optical distance to measure the speckle.

In order to detect the speckle, the sample groove portion 201 and the sensor module 400 may be formed in various ways.

For example, the light is emitted to one sample groove portion 201 so that a speckle is detected in a single sensor module 400, and a plurality of sensor modules 400 may be provided at a plurality of points in one sample groove portion 201 and detect speckles at a number of points.

In addition, a plurality of sample groove portions 201 may be formed and a different antibiotic may be injected to each of the sample groove portions 201. Alternatively, a different amount of the same antibiotics may be injected to each of the sample groove portions 201 and the speckle scattered from the sample in each sample groove portion 201 may be detected.

The controller 500 may control the light emitted by the light emission module 300, and may store and analyze the images detected by the sensor module 400. The controller 500 may include the light emission controller 510, the imaging collector 520, the corrector 540, and the estimator 550, and specific descriptions thereof are the same as described above.

As shown in FIG. 1, the case 600 may include a cover 610 that can open and close to cover the sample receiving module 200 so that the sample is not exposed to the external environment when a test is performed by coupling the container 10 to the sample receiving module 200.

The case 600 may be a structure which has an internal accommodating space to accommodate the sample receiving module 200, the light emission module 300, the sensor module 400, and the controller 500 and has sufficient strength and durability to support these components.

Figure 10:
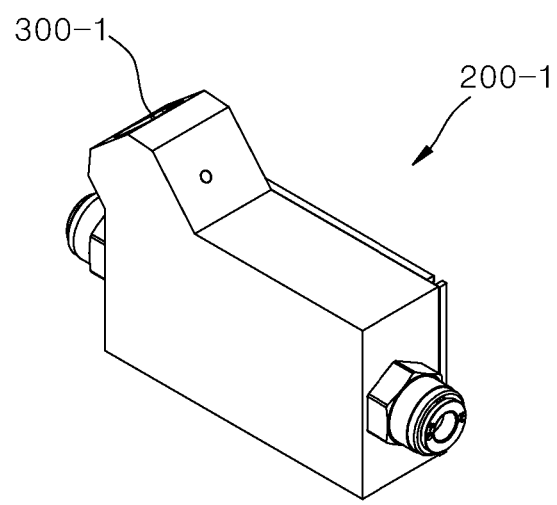
FIG. 10 is a perspective view of a sample receiving module according to another embodiment of the present invention.
Figure 11:
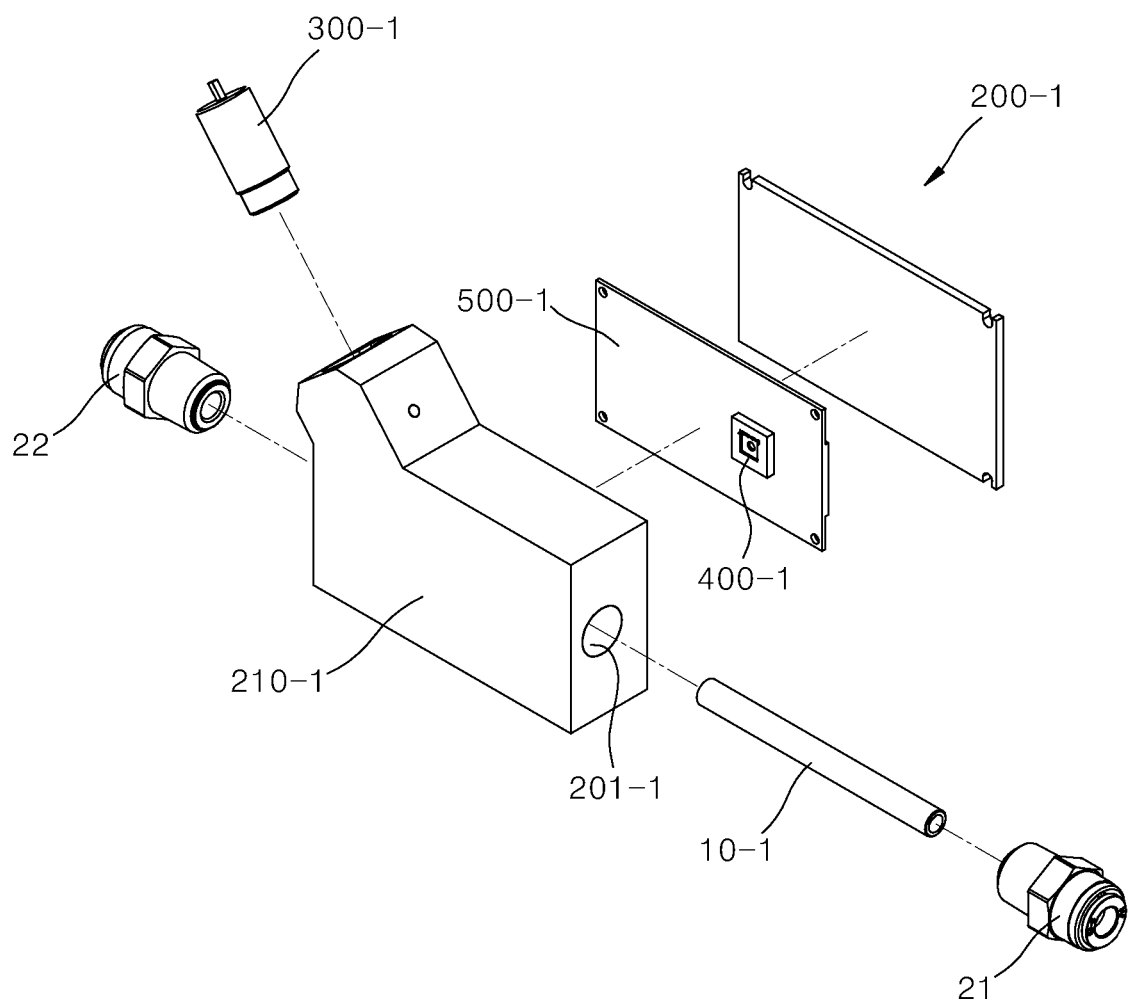
FIG. 11 is an exploded perspective view of the sample receiving module of FIG. 10.
Figure 12:
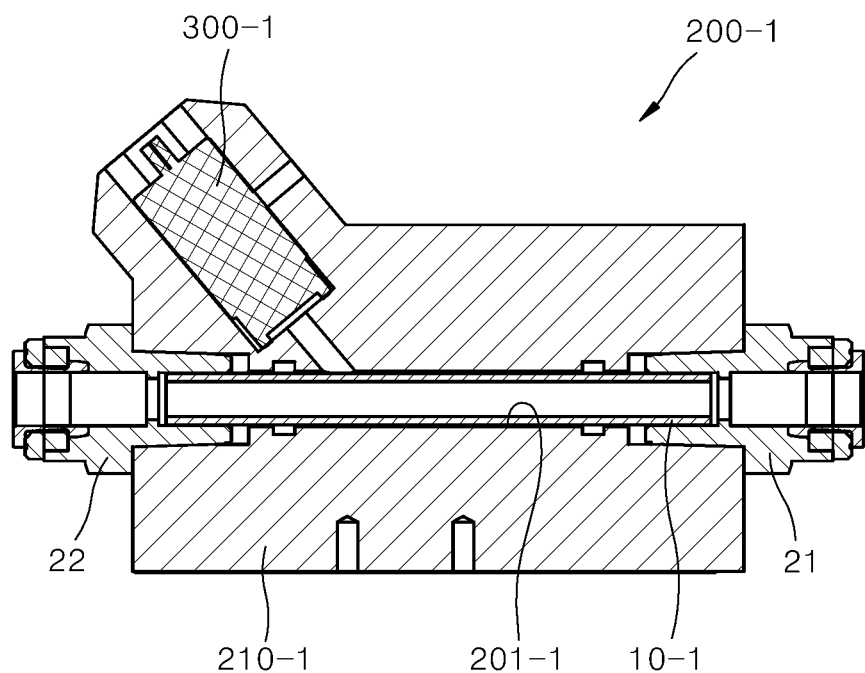
FIG. 12 is a cross-sectional view showing a cross section of the sample receiving module of FIG. 10.

FIG. 10 is a perspective view of a sample receiving module 200-1 according to another embodiment of the present invention, FIG. 11 is an exploded perspective view of the sample receiving module 200-1, and FIG. 12 is a cross-sectional view showing a cross section of the sample receiving module 200-1.

As shown in FIGS. 10 to 12, the sample receiving module 200-1 may include a sample receiving block 210-1, a sample receiving block cover, a first joint portion 21, and a second joint portion 22.

The sample receiving block 210-1 may have a groove portion formed on one side thereof to accommodate a light emission module 300-1, a sensor module 400-1 may be formed on the other side of the sample receiving block 210-1, and a sample groove portion 201-1 may be formed to accommodate therein a container 10-1.

The sample groove portion 201-1 may be in a hollow shape with openings at opposite sides, and a tubular container 10-1 may be inserted therein and fixed to the sample receiving block 210-1 by means of the first joint portion 21 and the second joint portion 22 at each side of the inserted container 10-1.

At this time, the container 10-1 is in a hollow tube shape with openings at opposite sides and the sample can flow inside the container 10-1. The flow of the sample is stopped by valves (not shown) formed on each side of the container 10-1 so that the sample can be accommodated in the container 10-1.

Surface treatment may be performed on the sample groove portion 201-1 to remove unevenness of a surface so that the light scattered by the sample accommodated in the sample groove portion 201-1 can be uniformly reflected on the surface of the sample groove portion 201-1.

In addition, the sample receiving block 210-1 may be formed of aluminum having excellent thermal conductivity and relatively high light reflectivity.

The light emission module 300-1 emits light in an inclined direction from one side of the container 10-1 to generate a speckle due to reflection and scattering in the container 10-1, and the sensor module 400-1 provided on the other side of the container 10-1 may detect the speckle.

As shown in FIG. 4, the controller 500 may be formed inside the body 100, and, as shown in FIG. 12, a receiving portion that can accommodate the controller 500-1 may be formed on at least one side of the sample receiving block 210-1, whereby the controller 500-1 may be formed inside the sample receiving block 210-1. Here, the role of the controller 500-1 is the same as described above.

As described above, the system and apparatus for detecting microbes according to the present invention are equipment using laser speckles, which can more precisely and uniformly detect speckles generated from bacteria or microbes contained in a sample by correcting the difference in the amount of light which is caused when a light source of the same wavelength is used or a light source is split for use in the sample in order to perform an antibiotic susceptibility test on the sample containing the bacteria or microbes.

According to an embodiment of the present invention, it is possible to sense motion of bacteria or microbes contained in a sample by using laser speckles. Accordingly, reactivity of bacteria or microbes to antibiotics may be tested by using laser speckles, so that antibiotic susceptibility of the bacteria or microbes can be quickly tested.

In addition, an apparatus and method for detecting microbes may be realized, which can more accurately and uniformly detect speckles generated due to the bacteria or microbes contained in a sample by correcting the difference in the amount of light which is caused when a light source of the same wavelength is used or a light source is split for use in the sample. However, the scope of the present invention is not limited by these effects.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A system for detecting microbes, in which light is emitted to a sample through a light emission module, a sensor module detects speckles generated when the emitted light is scattered by motion of bacteria or microbes contained in the sample, and a controller stores and analyzes images detected by the sensor module to test microbial detection,
wherein controller comprises
a light emission controller connected to the light emission module and configured to control an emission period and an emission intensity of light emitted by the light emission module;
an imaging collector connected to the sensor module and configured to store a speckle image generated through multiple scattering by the bacteria or microbes contained in the sample;
a corrector configured to correct a deviation caused by a difference in the amount of light when the light emission module emits the light; and
an estimator configured to estimate, in real-time, presence or absences of the bacteria or microbes in the sample or a concentration of the bacteria or microbes.

2. The system of claim 1, wherein the corrector comprises
a light amount calculator configured to calculate an amount of light that is a numerical value of brightness of the speckle image stored in the imaging collector;
a light amount comparer configured to compare the amount of light with a preset reference range to determine whether the amount of light falls within the reference range; and
a shutter speed controller configured to control the brightness of the speckle image by adjusting a shutter speed when the amount of light does not fall within the preset reference range.

3. The system of claim 1, wherein the controller further comprises an obtainer configured to obtain a temporal correlation of the speckles by using the detected speckle.

4. A method of detecting microbes comprising:
a light irradiation step of emitting, at a light emission module, light to bacteria or microbes contained in a sample;
an imaging collection step of storing, at a sensor module, a speckle image generated through multiple scattering by the bacteria or microbes contained in the sample;
a light-amount calculation step of calculating, at a light amount calculator provided in a controller, an amount of light that is a numerical value of brightness of the speckle image; and
a comparison step of comparing, at a light amount comparer provided in the controller, the amount of light with a preset reference range to determine whether the amount of light falls within the reference range,
wherein the method further comprises
an estimation step of estimating, in real-time, presence or absence of the bacteria or microbes in the sample or a concentration of the bacteria or microbes when it is determined in the comparison step that the amount of light falls within the reference range; and
a shutter speed adjustment step of controlling the brightness of the speckle image by adjusting a shutter speed when it is determined in the comparison step that the amount of light falls out of the reference range.

5. The method of claim 4, further comprising, after the shutter speed adjustment step, a shutter speed setting range comparison step of comparing the shutter speed with a preset shutter speed setting range to determine whether the shutter speed adjusted in the shutter speed adjustment step falls within the shutter speed setting range.

6. An apparatus for detecting microbes comprising:
a body;
a sample receiving module formed in the body and configured to accommodate a sample therein;
a light emission module configured to emit light to the sample;
a sensor module formed as a sensor to detect a speckle generated when the light emitted to the sample is scattered by motion of bacteria or microbes contained in the sample; and
a controller configured to control the light emitted by the light emission module and store and analyze images detected by the sensor module,
wherein the controller comprises
a light emission controller connected to the light emission module and configured to control an emission period and an emission intensity of light emitted by the light emission module;
an imaging collector connected to the sensor module and configured to store a speckle image generated through multiple scattering by the bacteria or microbes contained in the sample;
a corrector configured to correct a deviation caused by a difference in the amount of light when the light emission module emits the light; and
an estimator configured to estimate, in real-time, presence or absences of the bacteria or microbes in the sample or a concentration of the bacteria or microbes.

7. The apparatus of claim 6, wherein corrector comprises
- a light amount calculator configured to calculate an amount of light that is a numerical value of brightness of the speckle image stored in the imaging collector;
- a light amount comparer configured to compare the amount of light with a preset reference range to determine whether the amount of light falls within the reference range; and
- a shutter speed controller configured to control the brightness of the speckle image by adjusting a shutter speed when the amount of light does not fall within the preset reference range.

8. The apparatus of claim 6, wherein the light emission module comprises
- a light source portion configured to generate the light;
- a light transmission medium configured to transmit the light generated by the light source portion; and
- a light exit portion configured to emit the light transmitted from the light transmission medium to the sample.

9. The apparatus of claim 6, further comprising a case provided with a cover that can open and close to cover the sample receiving module so that the sample is not exposed to an external environment when a test is performed by coupling a container that contains the sample to the sample receiving module.

* * * * *